(12) United States Patent
Gross-Lorgouilloux et al.

(10) Patent No.: US 8,440,163 B2
(45) Date of Patent: May 14, 2013

(54) SLAKED LIME COMPOSITION AND ITS MANUFACTURING PROCESS

(75) Inventors: Marion Gross-Lorgouilloux, La Hulpe (BE); Gaetan Blandin, Maulevrier (FR); Thierry Chopin, St. Leu-la-Foret (FR)

(73) Assignee: S.A. Lhoist Recherche et Development, Ottignies-Louvain-la-Neuve (BE)

( * ) Notice: Subject to any disclaimer, the term of this patent is extended or adjusted under 35 U.S.C. 154(b) by 88 days.

(21) Appl. No.: 13/126,900

(22) PCT Filed: Oct. 29, 2009

(86) PCT No.: PCT/EP2009/064268
§ 371 (c)(1),
(2), (4) Date: May 16, 2011

(87) PCT Pub. No.: WO2010/049479
PCT Pub. Date: May 6, 2010

(65) Prior Publication Data
US 2011/0219986 A1    Sep. 15, 2011

(30) Foreign Application Priority Data

Oct. 30, 2008  (BE) .................................. 2008/0584

(51) Int. Cl.
*C01F 5/02*         (2006.01)

(52) U.S. Cl.
USPC ........................................................... 423/635

(58) Field of Classification Search .................. 423/635; 106/792
See application file for complete search history.

(56) References Cited

U.S. PATENT DOCUMENTS 5,332,436 A *    7/1994   Walker et al. ................. 106/792
2010/0196239 A1 *  8/2010   Dumont ........................ 423/241

FOREIGN PATENT DOCUMENTS
EP   PCT/EP2009/064268         5/2011

* cited by examiner

*Primary Examiner* — Paul Marcantoni
(74) *Attorney, Agent, or Firm* — Charles D. Gunter, Jr.

(57) ABSTRACT

The invention relates to a slaked lime composition containing $Ca(OH)_2$ particles of platelet crystalline morphology, called platelets, said platelets having a diameter D, this being the diameter of the circle circumscribing the platelet, a thickness e and an aspect ratio given by the ratio of said diameter of the platelet-circumscribing circle to said thickness, said composition having a platelet content of between 50 and 100% relative to the sum of the $Ca(OH)_2$ particles and said aspect ratio being between 10 and 300, and to its manufacturing process.

33 Claims, 4 Drawing Sheets

SLAKED LIME COMPOSITION AND ITS MANUFACTURING PROCESS

The present invention relates to slaked lime compositions comprising particles of $Ca(OH)_2$ with a platy crystalline morphology, called platelets, said platelets having a diameter of the circle circumscribing the platelet and a thickness, as well as an aspect ratio consisting of the ratio between said diameter of the circle circumscribing the platelet and said thickness.

Slaked lime consists of a set of solid particles, mainly of calcium dihydroxide $Ca(OH)_2$ which is the industrial result of hydration or slaking of quicklime with water. It is also called hydrated lime. Subsequently, calcium dihydroxide will simply be designated as "calcium hydroxide".

By quicklime is meant a mineral solid material, the chemical composition of which is mainly calcium oxide CaO. Quicklime is commonly obtained by calcination of limestone mainly consisting of $CaCO_3$. Quicklime contains impurities i.e. compounds such as magnesium oxide MgO, silica $SiO_2$ or further alumina $Al_2O_3$ etc., in an amount of a few percents. It is understood that these impurities are expressed in the aforementioned forms but may actually appear in different phases. Moreover, quicklime also contains sulfur-containing compounds; sulfur is usually present in quicklime in an amount from 0.01% to 0.2% by weight.

In a slaking mode <<via a dry route>>, the amount of added water is limited to that which is required for the slaking reaction, increased by what is lost as steam because of the exothermic nature of the reaction; the obtained product is powdery.

In a slaking mode <<via a wet route>>, the amount of added water is in substantial excess relatively to the amount strictly required for the slaking reaction. A <<milk of lime>> is then obtained, i.e. an aqueous suspension of slaked lime particles.

In an intermediate case relative to the two preceding ones, the obtained product is pasty and this is referred as slaking <<via a pasty route>> (lime putty).

Generally, the obtained slaked lime may obviously contain impurities stemming from the quicklime, as mentioned above.

It is generally recognized that the hydration reaction is controlled by a mechanism of CaO dissolution-re-precipitation of $Ca(OH)_2$, limited by the diffusion of water within the solid material CaO. Upon first contact between quicklime and water, the lime particles dissolve at the surface, at the most active sites causing formation of $Ca(OH)_2$. This reaction is accompanied by an increase in volume and a release of heat. The quicklime particles are then placed under stress, they crack, leaving wide accesses to the hydration water in order to continue the reaction. The reaction stops when all the lime has been converted into calcium hydroxide or when all the water of the system has been consumed.

The kinetics of the quicklime hydration reaction is clearly dependent on the reactivity of quicklime. Quicklime stemming from mild calcinations will have a high porosity and will exhibit a large contact surface area to the slaking water. In this case, the hydration reaction is very rapid, often said to be explosive. Locally, the temperature may rise beyond 100° C. and lead to a reaction in the vapor phase. For more calcined limes, or even hard-burnt limes, the contact surface area between the lime and the water is limited, since the porosity of these limes is more closed and therefore the hydration reaction is slower. In all the cases, slaked lime appears as a set of disordered agglomerates of $Ca(OH)_2$ crystals of very small size, having any random morphology, sometimes described as amorphous.

Several phenomena are thereby set into play: diffusion of water, explosion of the grains and a reaction in the core of the grains. The observation of slaked limes, notably with a scanning electron microscope (SEM), shows
- in a large majority, non-uniform agglomerates with a random morphology;
- a few hexagonal crystals giving evidence of a secondary and minor mechanism of $Ca(OH)_2$ dissolution-$Ca(OH)_2$ recrystallization.

In order to provide specific properties or to improve existing properties of calcium hydroxides, there exists a need for having calcium hydroxides consisting in majority of particles with a defined morphology, in particular in the form of platelets, instead of $Ca(OH)_2$ agglomerates with random morphology, as usually encountered.

Synthetic calcium hydroxides (portlandite) are known, obtained from soda and calcium chloride for which the crystals are in the form of platelets (see for example Yasue et al. (Gypsum and lime, 1984) and Yilmaz et al. (Journal of Materials Science Letters, 1991)). These synthetic calcium hydroxide crystals lead to specific products which are not slaked lime crystals. Among others, Yilmaz et al relates to a cement composition and to the effect of the super-plasticizer SMF on the morphology and crystallization of portlandite.

It is also known to promote the formation of hexagonal crystals either by modifying the hydration mechanisms of quicklime, or by ageing of putties or aqueous suspensions already formed, via $Ca(OH)_2$ dissolution-$Ca(OH)_2$ recrystallization. Ageing however appears as a very slow and very limited phenomenon.

One skilled in the art may intend to modify the hydration mechanisms by slowing down the slaking reaction with the purpose of controlling or modifying the morphology of $Ca(OH)_2$ particles. A well-known way for obtaining a slower slaking is to resort to hard-burnt quicklimes. Observation with SEM however shows that such slaking does not lead to the formation of platelets or other particular morphologies.

Moreover, it is possible to modify the mechanisms of the slaking reaction of quicklime by using additives, so as to notably promote the mechanism of CaO dissolution/$Ca(OH)_2$ reprecipitation by slowing down the hydration kinetics.

For example, patent EP 0152008 discloses an aqueous slaking suspension in which there is calcium sulfate as well as an organic substance, in particular an oxycarbonic acid for delaying the slaking of quicklime. In this document, there is no mention of crystals in the form of platelets.

Also, document U.S. Pat. No. 5,332,436 discloses chemical agents modifying the slaking reaction such as ethanolamine, ethylene glycol and their derivatives (see column 2, line 54 to column 3 line 5). Mention is also made of the use of diethylene glycol (DEG). These chemical agents delay the slaking reaction. No mineral additive is added. Further crystallization in the form of platelets is disclosed with the purpose of increasing the specific surface area of the thereby obtained slaked lime. The portion of platelets with respect to agglomerates of any morphology is not specified; their thickness is not disclosed.

The object of BE 1017305 is calcium and/or magnesium hydroxide particles of very high reactivity, characterized in that they have an X-ray diffraction peak typical of slaked lime, with an intensity of less than 50%, preferably less than 20% (a reduction of at least 75%) of the intensity of a traditional hydrated lime, sign of a low crystallization, an X-ray diffraction peak being all the more intense as the crystallization is high. Indeed, preferably, at least 50% by weight, advantageously at least 75% or 85% by weight of the particles appear as very slightly crystallized micelles. According to document BE1017305, this slaked lime is prepared by simple reaction of milled quicklime with an amount of water corresponding to an actually specific water/lime weight ratio of 0.60/1 and optionally comprises additives from the family of siloxanes or organic polymers including one or more ether and alcohol functional groups and mixtures thereof. According to an advantageous detail, this document mentions that at least 50% by weight of the particles is formed of platelets having a thickness of less than 150 µm, in particular less than 75 µm (see page 12, lines 24 to 26).

Document KR 2002 0004916 discloses slaking during which additives are gradually added and at a controlled temperature, in the presence of a co-solvent. The additives are slaking-retardants and surfactants or dispersants added in a substantial amount, 1 to 3% with respect to the slaking water, i.e. 3 to 15% with respect to the quicklime mass.

Document BE 1006655 in the name of the applicant relates to a method for producing a lime milk with a high concentration of solid material (up to 60%) and low viscosity. This lime milk is prepared in the presence of a mineral anion (sulfate, sulfite or chloride) and of a polyanion (polyacrylate, polymethacrylate, methacrylic acid . . . ). The mineral anion is added independently of the organic polyanion, the mineral compound being added as soon as the beginning of the reaction, while the polyanion is added at the beginning, in the course of or at the end of the reaction and preferably in the course of or at the end of the reaction, which is clearly related to their respective role. The mineral anion has the purpose of slowing down the hydration of quicklime and of leading to the formation of larger $Ca(OH)_2$ crystals, the polyanion as for it playing a role of a dispersant. The milk obtained by this method contains $Ca(OH)_2$ microsheets. These microsheets have a thickness of less than 0.5 µm, preferably less than 0.3 µm and may have a lower face and an upper face parallel with each other, the surface of said faces being lower than 200 µm$^2$, preferably lower than 100 µm$^2$.

Document JP 60086066 discloses a use of a metal salt of a strong acid, alone or combined with a polyhydric alcohol with the purpose of obtaining slaked lime crystals in the form of platelets. There is no mention of the proportion of these crystals of specific morphology with respect to the non-uniform $Ca(OH)_2$ particles. The temperature of the hydration reaction is maintained below 50° C., in order to limit the rate of the hydration reaction.

Various mechanisms are mentioned in the literature for explaining the retarding effect which the additives have on the hydration reaction of quicklime:
- blocking of the most active sites of the quicklime notably by adsorption of the additives at the surface of the quicklime particles;
- formation around the quicklime particles of a slightly soluble layer which delays the slaking reaction;
- adsorption of the additives at the surface of the $Ca(OH)_2$ seeds, preventing the growth of the crystals;
- formation of complexes between the additives and the $Ca^{++}$ ions in solution.

The use of sulfates (also sulfites and bisulfites) is notably contemplated in order to slow down the hydration kinetics of quicklime. It has been notably demonstrated that the use of sulfate contributes to the formation of hexagonal platy crystals of calcium hydroxide. However, the proportion of hexagonal crystals remains reduced and the width of the platelets remains generally small in comparison to their thickness.

By adding sulfate as a single additive during slaking, for example according to JP 50086066, it is possible to observe platelets with a SEM but of small size (diameter <5 µm) and thick relatively to their size (thickness: 1-5 µm).

The use of DEG as a single additive during slaking, for example according to U.S. Pat. No. 5,332,436 or JP 60086066, does not allow SEM observation of a significant proportion of platelets or the like, which remain marginal with respect to the whole of the particles.

As pointed out above, there however exists a need for having calcium hydroxide compositions, for which the majority of the particles has a specific morphology.

The object of the invention is to overcome the drawbacks of the state of the art by providing slaked lime compositions which contain a substantial proportion of $Ca(OH)_2$ particles having a defined morphology, unlike the documents of the prior art for which the presence of platelets is fortuitous and/or non-controlled and in all the cases, the platelet morphology is a minority.

In order to solve this problem, a slaked lime composition is provided according to the invention, having a platelet content comprised between 50 and 100% with respect to the total amount of $Ca(OH)_2$ particles and for which said aspect ratio is comprised between 10 and 300.

Indeed, the composition according to the invention therefore has a majority of $Ca(OH)_2$ particles which are in the form of platelets and the formation of these platelets is controlled and reproducible, i.e. the proportion of these $Ca(OH)_2$ particles of defined morphology is greater than 50%, based on the total amount of $Ca(OH)_2$ particles, including those with random morphology, as usually encountered.

Further, in the composition according to the invention, said platelets have a face with a characteristic dimension D, greater than the thickness e. The characteristic dimension D is the diameter of the circle circumscribing one face of the platelet.

Indeed, it is appropriate that these three-dimensional $Ca(OH)_2$ crystals of defined morphology (particles with a platy crystalline morphology) have a ratio D/e greater than or equal to 10.

This ratio is called within the scope of the present invention an <<aspect ratio>>. In the aforementioned documents, slaked limes having such calcium hydroxide particles are not described.

More particularly, the particles having a platy crystalline morphology have an aspect ratio D/e comprised between 10 and 300, preferably between 20 and 200, more preferentially between 30 and 100, advantageously between 45 and 80.

Advantageously the particles of the slaked lime composition according to the invention have a substantially hexagonal platy crystalline morphology.

By the terms of "substantially hexagonal platy crystalline morphology", are meant three-dimensional crystallized slaked lime particles, for which one of the faces, when crystallization is complete, has an irregular, regular or further truncated hexagonal section.

Advantageously, the slaked lime composition has a platelet content of more than 70%, more particularly more than 80% and advantageously more than 90%, based on the total of the $Ca(OH)_2$ particles, including those with random morphology, as usually encountered.

Advantageously, the dimension D is comprised between 1 µm and 80 µm. The majority of the particles having a platy crystalline morphology will more particularly have a dimension D comprised between 2 and 40 µm and preferably between 3 µm and 30 µm.

Preferably, the thickness e is comprised between 0.05 µm and 1 µm and preferably between 0.1 and 0.5 µm.

Advantageously, the composition according to the invention is obtained by adding at least one mineral compound having a sulfur content and an organic compound, i.e. diethylene glycol (DEG). Accordingly, the composition according to the invention has a sulfur content, preferably between 0.01% and 1.5% based on the weight of the composition. Further, the composition according to the invention has in a preferred form, a DEG content preferably comprised between 0.1% and 2% based on the weight of the composition.

In this way, the slaked lime composition according to the invention allows a relatively high $Ca(OH)_2$ concentration to be maintained and therefore provision of a composition with high purity.

Preferably, the calcium hydroxide is present in an amount ranging from 80% to 98% by weight, based on the total weight of the composition, preferably in an amount comprised between 85% and 97%, more particularly between 90% and 96% and very advantageously between 92% and 95% by weight based on the total weight of the composition.

Indeed it is particularly advantageous that the slaked lime composition according to the invention be of high purity, irrespective of morphology.

Preferably, the alkaline metal, (notably sodium or potassium,) content of the composition according to the invention is lower that 3% by weight, more particularly lower than 2% and even lower than 1% by weight, based on a total weight of the composition.

Other embodiments of the composition according to the invention are indicated in the appended claims.

The object of the invention is also a method for manufacturing slaked lime from quicklime.

This method is characterized in that it comprises:
a mixture of quicklime, slaking water, a sulfur-containing mineral additive and DEG,
slaking of said quicklime by said slaking water, in the presence of said sulfur-containing mineral additive and DEG,
formation of $Ca(OH)_2$ platelets having a diameter of the circle circumscribing the platelet and a thickness, as well as an aspect ratio consisting of a ratio of said diameter of the circle circumscribing the platelet to the thickness, comprised between 10 and 300, at a platelet content comprised between 50 and 100% based on the total amount of formed $Ca(OH)_2$ particles.

A slaked lime composition according to the invention may be prepared according to a method for slaking quicklime by using a pair of additives, one being from mineral origin (sulfur-containing mineral additive), the other one being organic (DEG).

Said sulfur-containing mineral additive and DEG may be added either to the quicklime or to the slaking water, together or separately (one in the quicklime, the other in the water). In every case, both of these additives have to be present while putting the water in contact with the quicklime.

In an advantageous embodiment, said sulfur-containing mineral additive is added to the quicklime and the DEG is added to the slaking water.

In a preferred embodiment, the sulfur-containing mineral additive and DEG are added to the slaking water.

As this may be seen, the method according to the invention does not require more infrastructure than an infrastructure in which slaking is carried out in a standard way. Indeed, the method is particularly flexible since the additives are added either to the quicklime or to the slaking water. However, it is advantageous that the additive combination be added to the slaking water.

Preferably, the sulfur-containing mineral additive is selected from the group of sulfur-containing compounds, preferably from sulfates, sulfites, bisulfates and bisulfites with solubility (at 20° C.)$\geq$1 $g/dm^3$, from their derivatives and their mixtures. Said mineral additive is more particularly selected from the group formed by $CaSO_4$ (in the form of gypsum $CaSO_4.2H_2O$ for example), $MgSO_4$, $Na_2SO_4$, $Na_2SO_3$, $NaHSO_4$ and $NaHSO_3$, their derivatives and their mixtures.

The sulfur-containing mineral additive according to the invention is a salt or corresponding acid, selected so that it is capable of forming a slightly soluble compound with calcium ions in solution upon the quicklime hydration reaction. This slightly soluble compound preferably has water solubility comprised between 0.05 and 3 $g/dm^3$ at 20° C.

In a particularly advantageous way, said sulfur-containing mineral additive is added in an amount between 0.1% and 5%, in particular between 0.3% and 2.5% and preferably between 0.5% and 1.5% by weight of anhydrous additive based on the weight of the quicklime.

In this way, the total amount of sulfur, stemming from the quicklime and said sulfur-containing mineral additive, present in the medium before slaking, is comprised between 0.03% and 1.75%.

A portion of the sulfur present in the medium before slaking may of course be removed with excess water and it is estimated that the sulfur fraction remaining in the composition according to the invention varies between 50% and 100% of the sulfur initially present in the medium before slaking.

Further, advantageously, the DEG is added in an amount ranging from 0.1% to 2.5% by weight based on the weight of the quicklime, more particularly from 0.2% to 1%, and more preferentially from 0.3% to 0.6% by weight based on the weight of the quicklime.

Advantageously, said water is added for slaking in a quicklime/water weight ratio comprised between 1/1.5 and 1/12. Preferably quicklime is added to the water. The product is then obtained in the form of a putty or milk of lime.

In certain embodiments, the reaction time is from 1 to 5 hours, in particular 2 hours. More advantageously, the medium is stirred, during a part or the whole of the reaction time.

The method does not require any control of temperature.

A maturation time of the aforementioned mixture, with or without stirring of several hours, in particular for 12 hrs to 24 hrs may also be applied to the medium. With a subsequent step for removing water, optionally combined with deagglomeration or milling, a powdery product may be collected.

With this method, it is possible to control the morphology, by means of the aforementioned combination of additives.

Other embodiments of the method according to the invention are indicated in the appended claims.

Other features, details and advantages of the invention will become apparent from the description given hereafter, not as a limitation and with reference to the examples and to the figures.

Figure 1:
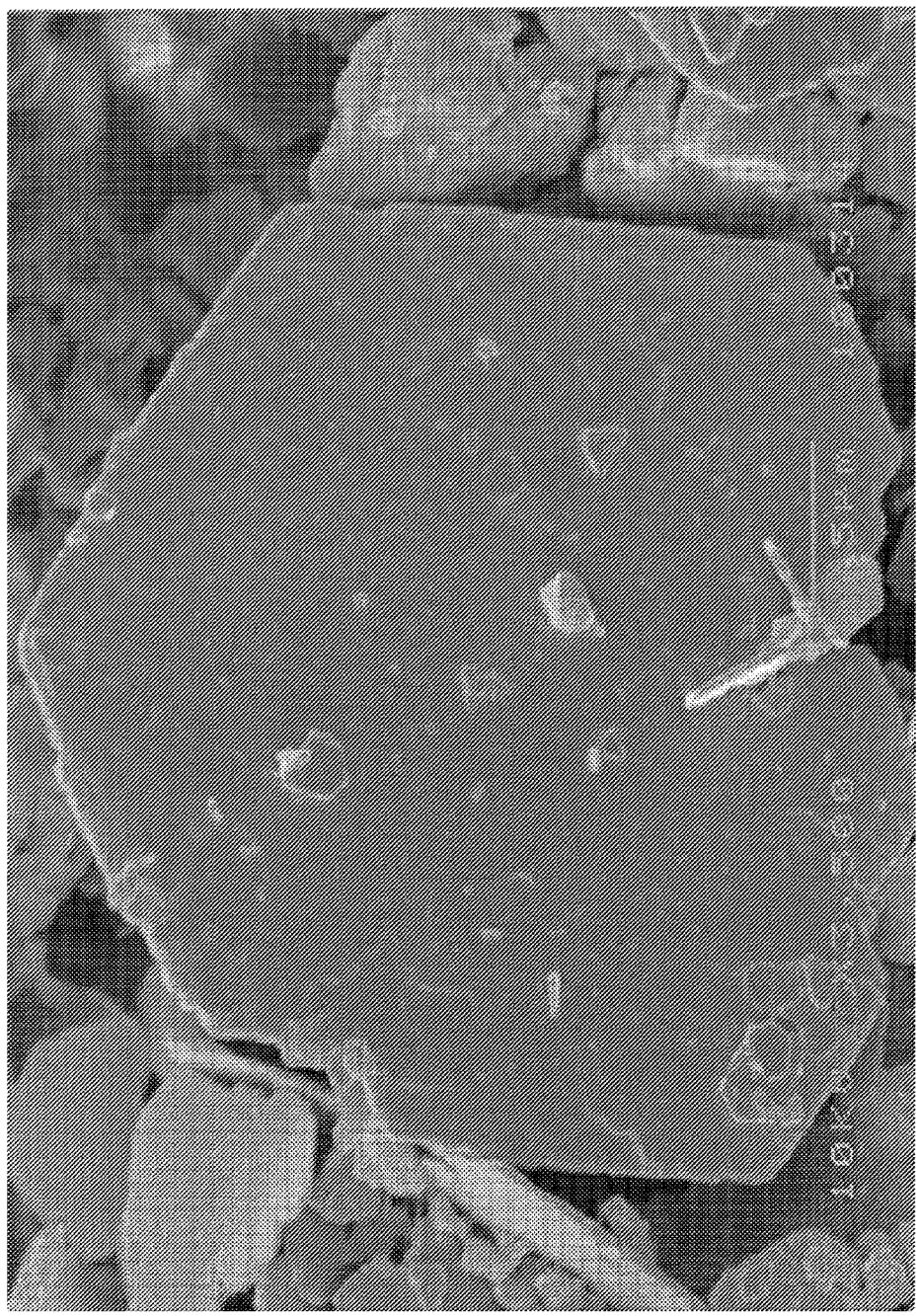
FIG. 1 is a view with the scanning electron microscope focused on a $Ca(OH)_2$ platelet obtained according to the invention.
Figure 2:
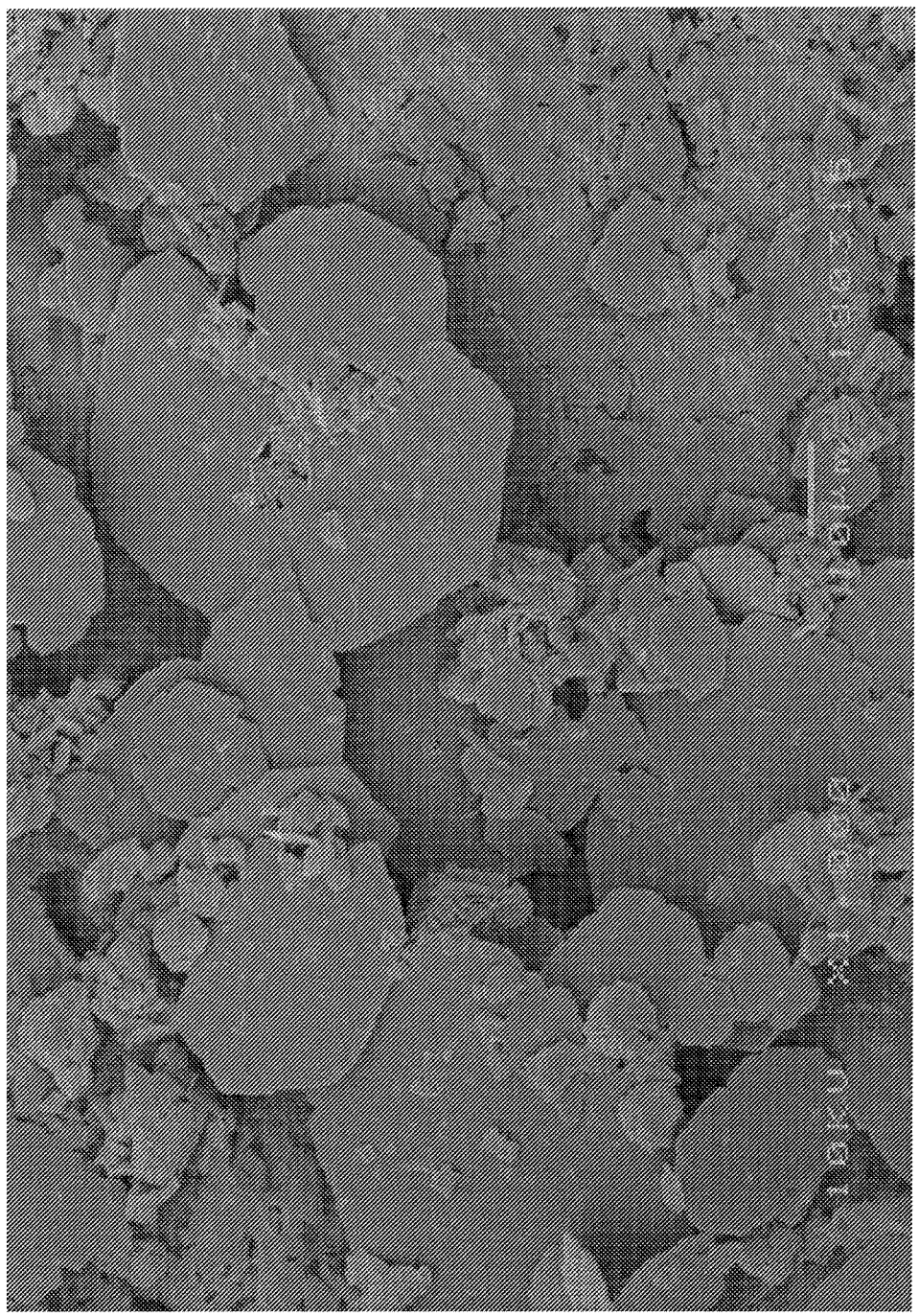
FIG. 2 is a view with the scanning electron microscope of a set of $Ca(OH)_2$ platelets of the composition according to the invention.
Figure 3:
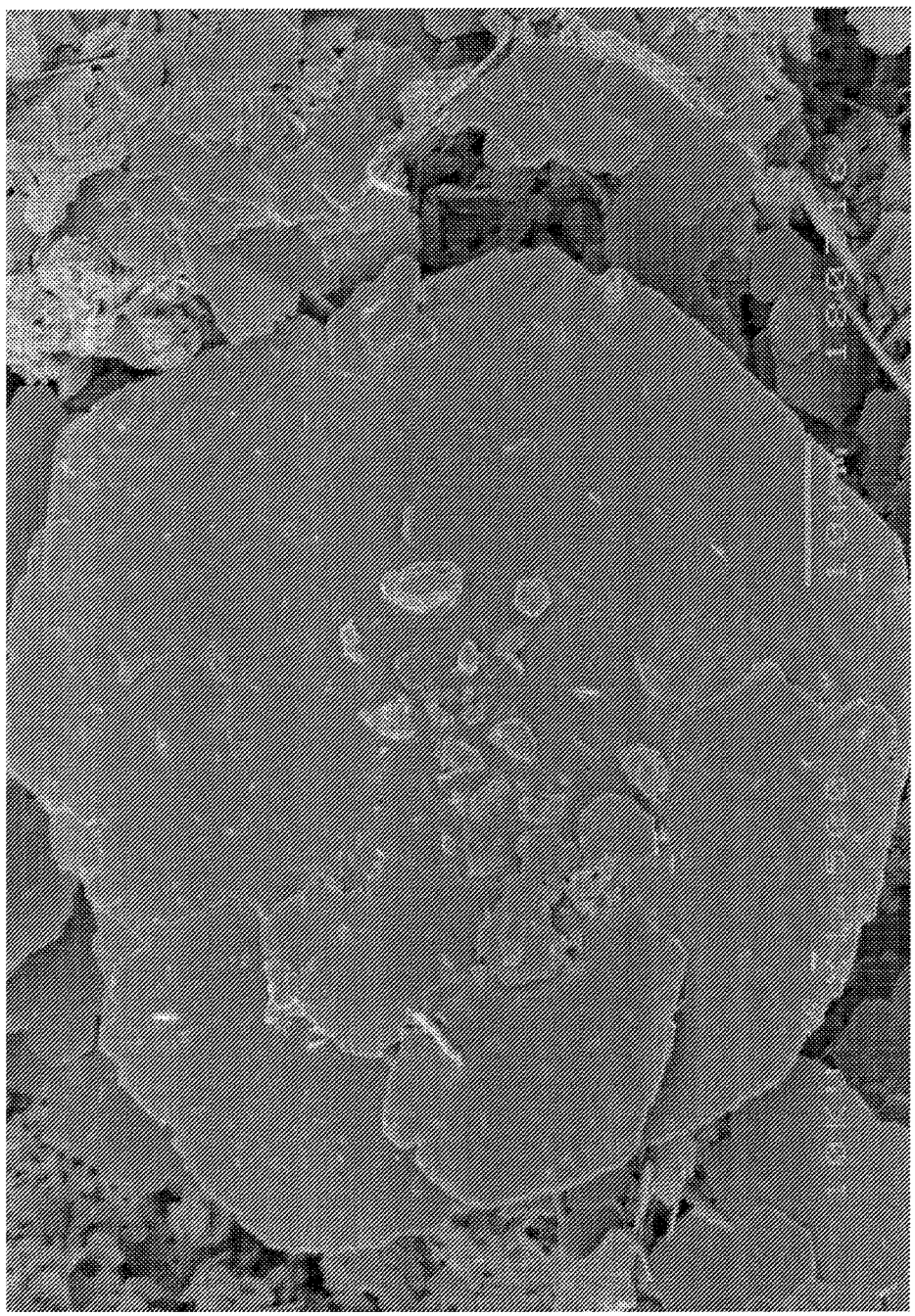
FIG. 3 is another view with the scanning electron microscope focused on a $Ca(OH)_2$ platelet of the composition according to the invention.

As this may be seen in FIG. 1 and in FIG. 3, the composition according to the invention has $Ca(OH)_2$ particles in the form of substantially hexagonal platelets having a high aspect ratio (small thickness e and large diameter D of the circumscribing circle). FIG. 2 illustrates a set of particles obtained where the number of platelets is high.

As this may be seen, the particles have a substantially hexagonal platy crystalline morphology (small thickness e and large diameter D). This means that crystallization tends to form regular or irregular hexagonal crystals and that this comprises all the intermediate forms illustrated in FIG. 2.

Figure 4:
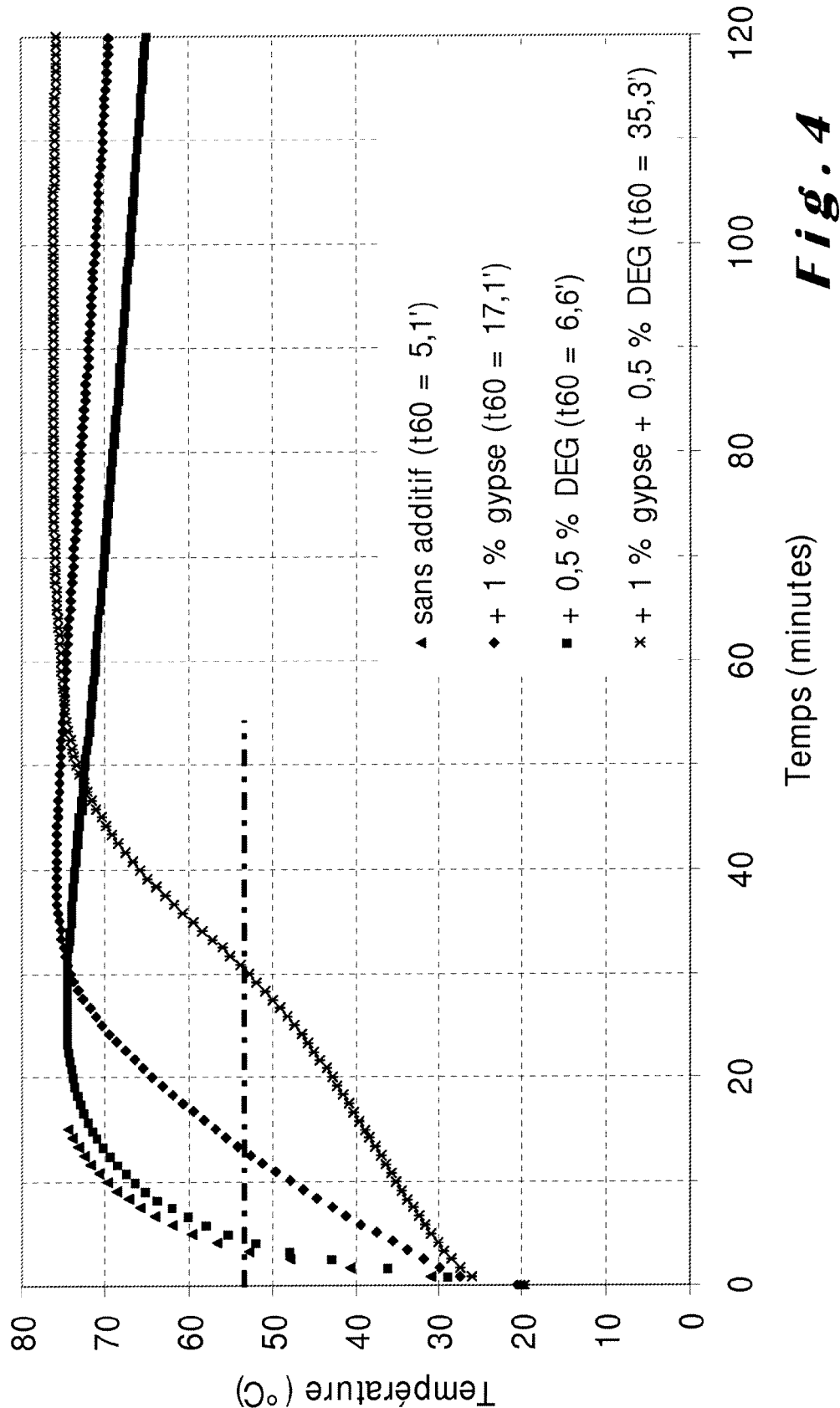
FIG. 4 is a graphical illustration of the effect of the sulfur-containing mineral additive (gypsum) and of DEG on the kinetics of the quicklime slaking reaction according to the invention.

FIG. 4 illustrates the change in temperature versus the slaking time when 150 g of industrial quicklime are hydrated in 600 cm³ of water, initially at 20° C. Four situations are illustrated: 1. a control solution without any additives; 2. quicklime slaking with water containing 0.5% of DEG; 3. quicklime slaking with water containing 1% of gypsum and 4. quicklime slaking with water containing 1% of gypsum and 0.5% of DEG. The aforementioned percentages of additives are expressed based on the weight of the quicklime.

As this may be seen from FIG. 4, DEG alone does not practically modify the curve as compared with the control solution. Moreover, no formation of any platelet is observed (see notably comparative Example No. 2). On the other hand, gypsum alone allows the reaction to be delayed. The hydration delay is represented by the value of $t_{60}$, i.e. the time required for reaching 60° C. in the slaked lime suspension, starting from water at 20° C. A platelet morphology is observed but the aspect ratio is not very high (see notably comparative example No. 1).

During the coupled use of gypsum and DEG, synergy is observed between both additives in FIG. 4, the addition of DEG leading to significant additional delaying effect with respect to addition of gypsum alone. A platelet morphology is observed which has a high aspect ratio (see notably Example No. 1).

These results suggest that the mineral additive having a sulfur content seems to have an effect on the control of the morphology while DEG seems to have an effect on the control of the thickness of the platelets.

The invention will now be described in more details by means of non-limiting examples.

EXAMPLES

Examples 1 to 10

All the tests are carried out by using 150 g of industrial quicklime from the same origin, except for example 7. The mass of water applied for a hydration reaction is calculated according to the $CaO/H_2O$ mass ratio selected for this reaction, as indicated in the Table 1 below. For each reaction, the calculated mass of water, heated beforehand to 20° C., is introduced into a container provided with a stirring system. The stirring system is selected so that the diameter of the stirring blades corresponds to about 50% of the internal diameter of the isothermal container.

The additives are added to the water, first the mineral and then the organic one (DEG); the different additives used as well as the proportions in which they were added, are noted in the Table 1 below. The proportions of additive are expressed based on the mass of quicklime.

Stirring is maintained for a few minutes in order to ensure good homogeneity of the system. At the end of this time, the 150 g of quicklime are introduced into the water/additives mixture. This reaction medium is maintained under stirring for 2 hours, and the lime milk obtained by this method is then left at rest for one night before being filtered on paper and dried at 105° C. The characterization of the hydrated products is accomplished by scanning electron microscopy (SEM).

TABLE 1

| Example | 1 | 2 | 3 | 4 | 5 | 6 |
|---|---|---|---|---|---|---|
| Mineral additive | $CaSO_4 \cdot 2H_2O$ | $MgSO_4 \cdot 7H_2O$ | $ZnSO_4 \cdot 7H_2O$ | $Na_2SO_4$ | $Na_2SO_3$ | $CaSO_4 \cdot 2H_2O$ |
| Ratio[1] | 1 | 1 | 1 | 1 | 1 | 1 |
| Mass of S provided by the additive (g) | 0.353 | 0.399 | 0.297 | 0.338 | 0.381 | 0.353 |
| % of S provided by the quicklime | 0.01 | 0.01 | 0.01 | 0.01 | 0.01 | 0.01 |
| Mass of S provided by the quicklime (g) | 0.015 | 0.015 | 0.015 | 0.015 | 0.015 | 0.015 |
| Initial total mass of S (g) | 0.368 | 0.414 | 0.312 | 0.353 | 0.396 | 0.368 |
| Initial mass of quicklime + mineral additive (g) | 151.5 | 151.5 | 151.5 | 151.5 | 151.5 | 151.5 |
| % of S in the initial mixture of quicklime + mineral additivel | 0.24 | 0.27 | 0.21 | 0.23 | 0.26 | 0.24 |
| DEG ratio[2] | 0.5 | 0.5 | 0.5 | 0.5 | 0.5 | 0.5 |
| $CaO/H_2O$[3] | 1/4 | 1/4 | 1/4 | 1/4 | 1/4 | 1/12 |
| P %[6] | 90 | 90 | 90 | 90 | 70 | 90 |
| D in μm[4] | 3-40 | 5-25 | 5-40 | 5-50 | 5-30 | 5-30 |
| e in μm[5] | 0.2-0.3 | 0.3-0.4 | 0.5-0.7 | 0.2-0.5 | 0.6-0.7 | 0.2-0.5 |
| D/e[7] | 10-200 | 12-85 | 7-80 | 10-250 | 7-50 | 10-250 |

| Example | 7 | 8 | 9 | 10 |
|---|---|---|---|---|
| Mineral additive | $CaSO_4 \cdot 2H_2O$ | $NaHSO_3$ | $NaHSO_4 \cdot H_2O$ | $CaSO_4 \cdot 2H_2O$ |
| Ratio[1] | 1 | 1 | 1 | 1 |
| Mass of S provided by the additive (g) | 0.353 | 0.462 | 0.400 | 0.353 |
| % of S provided by the quicklime | 0.01 | 0.01 | 0.01 | 0.01 |
| Mass of S provided by the quicklime (g) | 0.015 | 0.015 | 0.015 | 0.015 |
| Initial total mass of S (g) | 0.38 | 0.477 | 0.415 | 0.368 |

TABLE 1-continued

| | | | | |
|---|---|---|---|---|
| Initial mass of quicklime + mineral additive (g) | 151.5 | 151.5 | 151.5 | 151.5 |
| % of S in the initial mixture of quicklime + mineral additive1 | 0.24 | 0.31 | 0.27 | 0.24 |
| DEG ratio[2] | 0.5 | 0.5 | 0.5 | 1 |
| CaO/H$_2$O[3] | 1/4 | 1/4 | 1/4 | 1/4 |
| P %[6] | 90 | 90 | 90 | 80 |
| D in μm[4] | 2-30 | 2-30 | 2-30 | 2-30 |
| e in μm[5] | 0.1-0.5 | 0.1-0.5 | 0.1-0.5 | 0.2-0.5 |
| D/e[7] | 4-300 | 4-300 | 4-300 | 4-150 |

Ratio[1] = % by weight of the anhydrous sulfur-containing mineral compound based on the CaO mass.
Ratio[2] = % by weight of DEG based on the CaO mass.
Ratio[3] = weight ratio of the amount of quicklime to the water amount.
D in μm[4] = diameter of the platelets in μm = diameter of the circle circumscribing the platelet in μm (if the face is not a regular polygon, the circumscribing circle is the smallest which may include the whole platelet face).
e in μm[5] = thickness of the platelets in μm.
P %[6] = proportion of particles having a morphology of platelets based on the total number of Ca(OH)$_2$ particles.
D/e[7] = aspect ratio = ratio of the diameter (μm) to the thickness (μm) of the platelets.

Example 11

Example 1 was repeated with 20 kg of quicklime. The product obtained under the given conditions with 20 kg of quicklime is similar to the one obtained under the same experimental conditions with 150 g of quicklime. The proportion of obtained platelets was greater than 90%, the diameter D of the platelets was comprised between 3 and 4 μm while the thickness e reached 0.2 to 0.3 μm. The aspect ratio was comprised between 10 and 225.

COMPARATIVE EXAMPLES

Comparative Example 1

Example 1 was repeated but without adding any organic compound. The mass of sulfur in quicklime is 0.015 g while the mass of sulfur provided by the mineral additive is 0.353 g. The mass of the initial solid mixture is 151.5 g and the percentage of sulfur in the initial mixture therefore has a value of 0.24. The results are illustrated in Table 2. As this may be seen, many particles of slaked lime Ca(OH)$_2$ with a platelet crystalline morphology are synthesized, but the platelets are very small and the aspect ratio is not very high.

Comparative Example 2

Example 1 is repeated but without adding any mineral additive. The results are illustrated in Table 2. As this may be seen, the formation of platelets was not observed.

Comparative Example 3

Example 1 was repeated but the mineral additive is sodium sulfate and the proportion of quicklime with respect to the amount of water had the value of 1/0.6. The results are illustrated in Table 2. As this may be seen, the formation of platelets was not observed, which may be likely ascribed to the fact that the proportion of quicklime with respect to the amount of water is too high.

Comparative Example 4

Example 2 was repeated but the mineral additive is magnesium nitrate hydrated six times. The results are illustrated in Table 2. As this may be seen, the formation of platelets was not observed.

Comparative Example 5

Example 2 was repeated but the mineral additive is magnesium iodate hydrated four times. The results are illustrated in Table 2. As this may be seen, the platelets are in a too low proportion, they are too small and the aspect ratio is too low.

Comparative Example 6

Example 1 was repeated, but the mineral additive added in an amount of 1% of anhydrous mineral additive based on the weight of quicklime is SrSO$_4$, a sulfur carrier which is slightly soluble (solubility in water at 20° C.=0.14 g/dm$^3$). The mass of sulfur in the quicklime is 0.015 g while the mass of sulfur provided by the mineral additive is 0.261 g. The mass of the initial solid mixture is 151.5 g and the percentage of sulfur in the initial mixture therefore has the value 0.18. The results are illustrated in Table 2. As this may be seen, the formation of slaked lime Ca(OH)$_2$ particles with a platelet crystalline morphology is very limited.

Comparative Example 7

Example 1 was repeated, but the mineral additive added in an amount of 1% of anhydrous mineral additive based on the quicklime weight is Na$_2$S$_2$O$_3$ hydrated five times, a soluble sulfur carrier but which forms with Ca$^{++}$ ions from the quicklime in solution a highly soluble compound (solubility in water at 20° C. of CaS$_2$O$_3$ is very high). The mass of sulfur in the quicklime is 0.015 g while the mass of sulfur provided by the mineral additive is 0.608 g. The mass of the initial solid mixture is 151.5 g and the percentage of sulfur in the initial mixture therefore has the value of 0.41. The results are illustrated in Table 2. As this may be seen, formation of platelets was not observed.

Comparative Example 8

Example 1 was repeated, but while reducing the water proportion of the mixture. This time, 500 g of quicklime no. 1 were added in 500 g of demineralized water at 20° C. which corresponds to a CaO/H$_2$O ratio of 1/1 instead of 1/4 in Example 1. This scenario may be considered as a hydration via a pasty/dry route. Stirring was modified in order to obtain a homogeneous mixture. The mass of sulfur in the quicklime is 0.05 g while the mass of sulfur provided by the mineral additive is 1.176 g. The mass of the initial solid mixture is 505 g and the percentage of sulfur in the initial mixture therefore has the value of 0.24. The results are illustrated in Table 2. As this may be seen, no formation of platelets is observed.

seen, the obtained platelets are small and their aspect ratio is not very high. The obtained slaked lime $Ca(OH)_2$ particles

TABLE 2 of the comparative examples

| Example | 1 | 2 | 3 | 4 | 5 | 6 | 7 | 8 |
|---|---|---|---|---|---|---|---|---|
| Mineral additive | $CaSO_4 \cdot 2H_2O$ | none | $Na_2SO_4$ | $Mg(NO_3)_2 \cdot 6H_2O$ | $Mg(IO_3)_2 \cdot 4H_2O$ | $SrSO_4$ | $Na_2S_2O_3 \cdot 5H_2O$ | $CaSO_4 \cdot 2H_2O$ |
| Ratio[1] | 1 | — | 1 | 1 | 1 | 1 | 1 | 1 |
| Organic additive | — | DEG | DEG | DEG | DEG | DEG | DEG | DEG |
| Ratio[2] | | 0.5 | 0.5 | 0.5 | 0.5 | 0.5 | 0.5 | 1/0.6 |
| $CaO/H_2O$[3] | 1/4 | 1/4 | 1/0.6 | 1/4 | 1/4 | 1/4 | 1/4 | |
| P %[6] | 90 | 0 | 0 | 0 | 15 | 40 | 0 | 0 |
| D in µm[4] | <10 | — | — | — | <5 | <5 | — | — |
| e in µm[5] | 1-5 | — | — | — | 1 | 0.6 | — | — |
| D/e[7] | <10 | — | — | — | <5 | 3-7 | — | — |

Ratio[1] = % by weight of the anhydrous compound based on the CaO mass.
Ratio[2] = % by weight of the organic additive based on the CaO mass.
Ratio[3] = weight ratio of the amount of quicklime to the amount of water.
D in µm[4] = diameter of the platelets in µm = diameter of the circle circumscribing the platelet in µm.
e in µm[5] = thickness of the platelets in µm.
P %[6] = proportion of particles having a platelet morphology with respect to the number of $Ca(OH)_2$ particles.
D/e[7] = aspect ratio = ratio of the diameter (µm) to the thickness (µm) of the platelets.

Comparative Example 9

Example 1 was repeated, but the DEG which is the organic additive used in Example 1 is replaced by mono-ethylene glycol (MEG) in an amount of 0.5% of the weight of the quicklime. The mass of sulfur in the quicklime is 0.015 g while the mass of sulfur provided by the mineral additive is 0.353 g. The mass of the initial solid mixture is 151.5 g and the percentage of sulfur in the initial mixture therefore has the value of 0.24. The results are illustrated in Table 3. As this may be seen, the obtained platelets are small and their aspect ratio is not very high. The obtained slaked lime $Ca(OH)_2$ particles with platy crystalline morphology are similar to those obtained in comparative Example 1 in the presence of gypsum alone, indicating that MEG does not have any additional effect relatively to gypsum alone.

Comparative Example 10

Example 1 was repeated, but DEG which is the organic additive used in Example 1 is replaced with tri-ethylene glycol (TEG) in an amount of 3% by weight of the quicklime. The mass of sulfur in the quicklime is 0.015 g while the mass of sulfur provided by the mineral additive is 0.353 g. The mass of the initial solid mixture is 151.5 g and the percentage of sulfur in the initial mixture therefore has the value of 0.24. The results are illustrated in Table 3. As this may be seen, the obtained platelets are small and their aspect ratio is not very high. The obtained slaked lime $Ca(OH)_2$ particles with a platelet crystalline morphology are similar to those obtained in the comparative Example 1 in the presence of gypsum alone, indicating that TEG does not have any additional effect relatively to gypsum alone.

Comparative Example 11

Example 1 was repeated, but the DEG which is the organic additive used in Example 1 was replaced with di-ethanolamine (DEA) in an amount of 3% by weight of the quicklime. The mass of sulfur in the quicklime is 0.015 g while the mass of sulfur provided by the mineral additive is 0.353 g. The mass of the initial solid mixture is 151.5 g and the sulfur percentage in the initial mixture therefore has the value of 0.24. The results are illustrated in Table 3. As this may be with a platelet crystalline morphology are similar to those obtained in comparative Example 1 in the presence of gypsum alone, indicating that DEA does not have any additional effect relatively to gypsum alone.

TABLE 3 of the comparative examples

| | Example | | |
|---|---|---|---|
| | 9 | 10 | 11 |
| Mineral additive | $CaSO_4 \cdot 2H_2O$ | $CaSO_4 \cdot 2H_2O$ | $CaSO_4 \cdot 2H_2O$ |
| Ratio[1] | 1 | 1 | 1 |
| Organic additive | MEG | TEG | DEA |
| Ratio[2] | 0.5 | 3 | 3 |
| $CaO/H_2O$[3] | 1/4 | 1/4 | 1/4 |
| P %[6] | 90 | 80 | 80 |
| D in µm[4] | <10 | <10 | 2-15 |
| e in µm[5] | 1-5 | 1-3 | 0.5-2 |
| D/e[7] | 2-10 | 3-10 | 1-30 |

Ratio[1] = % by weight of the anhydrous compound based on CaO mass.
Ratio[2] = % by weight of the organic additive based on the CaO mass.
Ratio[3] = weight ratio of the amount of quicklime to the amount of water.
D in µm[4] = diameter of the platelets in µm = diameter of the circle circumscribing the platelet in µm.
e in µm[5] = thickness of the platelets in µm.
P %[6] = proportion of particles having a platelet morphology relatively to the number of $Ca(OH)_2$ particles.
D/e[7] = aspect ratio = ratio of the diameter (µm) to the thickness (µm) of the platelets.

It should be understood that the present invention is by no means limited to the embodiments described above and that many modifications may be made thereto without departing from the scope of the appended claims.

The invention claimed is:
1. A slaked lime composition comprising $Ca(OH)_2$ particles with a platy crystalline morphology, or platelets, the platelets having a diameter D between 1 µm and 80 µm of the circle circumscribing the platelet and a thickness e between 0.05 µm and 1 µm, as well as an aspect ratio consisting of the ratio between the diameter D of the circle circumscribing the platelet and the thickness e,
characterized in that the composition has a platelet content between 50 and 100% based on the total of the $Ca(OH)_2$ particles, and in that the aspect ratio is between 10 and 300.

2. The slaked lime composition according to claim 1, wherein the aspect ratio D/e is between 20 and 200.

3. The slaked lime composition according to claim 1, wherein the aspect ratio D/e is between 30 and 100.

4. The slaked lime composition according to claim 1, wherein the aspect ratio D/e is between 45 and 80.

5. The slaked lime composition according to claim 1, wherein the particles having a platy crystalline morphology have a hexagonal platy crystalline morphology.

6. The slaked lime composition according to claim 1, wherein the platelet content is greater than 70%, based on the total of the $Ca(OH)_2$ particles.

7. The slaked lime composition according to claim 1, wherein the platelet content is greater than 80%, based on the total of the $Ca(OH)_2$ particles.

8. The slaked lime composition according to claim 1, wherein the platelet content is greater than 90%, based on the total of the $Ca(OH)_2$ particles.

9. The slaked lime composition according to claim 1, wherein the dimension D is between 1 µm and 80 µm.

10. The slaked lime composition according to claim 1, wherein the dimension D is between 2 µm and 40 µm.

11. The slaked lime composition according to claim 1, wherein the dimension D is between 3 µm and 30 µm.

12. The slaked lime composition according to claim 1, wherein the thickness e is between 0.05 µm and 1 µm.

13. The slaked lime composition according to claim 1, wherein the thickness e is between 0.1 µm and 0.5 µm.

14. The slaked lime composition according to claim 1, having a sulfur content between 0.01% and 1.5%, based on the weight of the composition.

15. The slaked lime composition according to claim 1, having a diethylene glycol content between 0.1% and 2%, based on the weight of the composition.

16. The composition according to claim 1, wherein calcium hydroxide is present in an amount ranging from 80% to 98% by weight, based on the total weight of the composition.

17. The composition according to claim 1, wherein calcium hydroxide is present in an amount ranging from 85% to 97% by weight, based on the total weight of the composition.

18. The composition according to claim 1, wherein calcium hydroxide is present in an amount ranging from 90% to 96% by weight, based on the total weight of the composition.

19. The composition according to claim 1, wherein calcium hydroxide is present in an amount ranging from 92% to 95% by weight, based on the total weight of the composition.

20. A slaked lime composition comprising $Ca(OH)_2$ particles with a platy crystalline morphology, or platelets, the platelets having a diameter D between 1 µm and 80 µm of the circle circumscribing the platelet and a thickness e between 0.05 µm and 1 µm, the slaked lime being made by mixing quicklime, slaking water, a sulfur containing mineral additive and diethylene glycol.

21. A method for manufacturing slaked lime from quicklime comprising:

a mixture of quicklime, slaking water, a sulfur-containing mineral additive and diethylene glycol, slaking of the quicklime by the slaking water in the presence of the sulfur-containing mineral additive and diethylene glycol, formation of $Ca(OH)_2$ platelets having a diameter D between 1 µm and 80 µm of the circle circumscribing the platelet and a thickness e between 0.05 µm and 1 µm, as well as an aspect ratio consisting of a ratio of the diameter of the circle circumscribing the platelet to the thickness between 10 and 300, at a platelet content between 50 and 100% based on the total of the formed $Ca(OH)_2$ particles.

22. The method according to claim 21, wherein the sulfur-containing mineral additive is added to the quicklime and diethylene glycol is added to the slaking water.

23. The method according to claim 21, wherein the sulfur-containing mineral additive and diethylene glycol are added to the slaking water.

24. The method according claim 21, further comprising maturation of the mixture for 12 to 24 hours.

25. The method according to claim 21, wherein the sulfur-containing mineral additive is selected from the group consisting of sulfates, sulfites, bisulfates and bisulfites having a solubility at 20° C. greater than or equal to 1 $g/dm^3$.

26. The method according to claim 21, wherein the sulfur-containing mineral additive is selected from the group consisting of $CaSO_4$, $MgSO_4$, $Na_2SO3$, $NaHSO_4$, $NaHSO_3$, and mixtures thereof.

27. The method according to claim 21, wherein the sulfur-containing mineral additive is added in an amount between 0.1% and 5%, by weight of anhydrous additive based on the weight of the quicklime.

28. The method according to claim 21, wherein the sulfur-containing mineral additive is added in an amount between 0.3% and 2.5% by weight of anhydrous additive based on the weight of the quicklime.

29. The method of claim 21, wherein the sulfur-containing mineral additive is added in an amount between 0.5% and 1.5% by weight of anhydrous additive based on the weight of the quicklime.

30. The method according to claim 21, wherein diethylene glycol is added in an amount ranging from 0.1% to 2.5% by weight based on the weight of quicklime.

31. The method according to claim 21, wherein diethylene glycol is added in an amount ranging from 0.2% to 1% by weight based on the weight of quicklime.

32. The method according to claim 21, wherein diethylene glycol is added in an amount ranging from 0.3% to 0.6% by weight based on the weight of quicklime.

33. The method according to claim 21, wherein the water is added for the slaking in a quicklime/water weight ratio between 1/1.5 and 1/12.

* * * * *